United States Patent [19]
Hara

[11] Patent Number: 5,629,600
[45] Date of Patent: May 13, 1997

[54] CHARGER FOR USE WITH A NICKEL-CADMIUM BATTERY THAT USES CHARGE AND DISCHARGE CYCLES DEPENDENT ON VOLTAGE AND CURRENT

[75] Inventor: Yoshimasa Hara, Nagoya, Japan

[73] Assignee: Brother Kogyo Kabushiki Kaisha, Nagoya, Japan

[21] Appl. No.: 262,494

[22] Filed: Jun. 20, 1994

[30] Foreign Application Priority Data

Jul. 26, 1993 [JP] Japan ..................... 5-183681

[51] Int. Cl.$^6$ ..................... H01M 10/44; H01M 10/46
[52] U.S. Cl. ..................... 320/5; 320/32; 320/14
[58] Field of Search ..................... 320/5, 9, 13, 4, 320/48, 32, 33, 39

[56] References Cited

U.S. PATENT DOCUMENTS

| | | | |
|---|---|---|---|
| 4,709,202 | 11/1987 | Koenck et al. | 320/43 |
| 4,734,635 | 3/1988 | Theobald | 320/13 |
| 5,289,102 | 2/1994 | Toya | 320/22 |
| 5,307,000 | 4/1994 | Podrazhansky et al. | 320/14 |
| 5,440,220 | 8/1995 | Sato et al. | 320/13 |
| 5,479,084 | 12/1995 | Satsuma et al. | 320/13 |
| 5,488,282 | 1/1996 | Hayden et al. | 320/14 |

*Primary Examiner*—Robert Nappi
*Attorney, Agent, or Firm*—Oliff & Berridge

[57] ABSTRACT

A charger has a charging unit for charging a Ni-Cd battery using a DC supply, a charging switch, and a discharging unit for discharging, by a predetermined quantity, an electric charge stored in the Ni-Cd battery by the charging unit. Further, the charger repeats a charging and discharging process a predetermined number of times to charge the Ni-Cd battery. A controller cuts off a charging current flowing in the Ni-Cd battery when the value of the charging current reaches a rated capacity of the Ni-Cd battery and subsequently effects a repetitive control of both the charging of the Ni-Cd battery and the cutting off of the charging current. Thus, a Ni-Cd battery whose electromotive force has been reduced and whose internal electric resistance has increased can be charged without continuously producing heat. Accordingly, the charger can recover a Ni-Cd battery whose electromotive force has been reduced because the Ni-Cd battery has been unused for a long period without deteriorating the Ni-Cd battery.

22 Claims, 3 Drawing Sheets

CHARGER FOR USE WITH A NICKEL-CADMIUM BATTERY THAT USES CHARGE AND DISCHARGE CYCLES DEPENDENT ON VOLTAGE AND CURRENT

BACKGROUND OF THE INVENTION

1. Field of the Invention

The present invention relates to a charger used for charging a Ni-Cd (Nickel-Cadmium) battery.

2. Description of the Related Art

Heretofore, a charging device or charger used for charging a Ni-Cd battery has basically been made up of a constant-current circuit. When one attempts to charge the Ni-Cd battery using the charger, a controller of the charger detects a charging current flowing in the Ni-Cd battery and effects control for causing the charging current to reach a predetermined current value corresponding to the rated capacity of the Ni-Cd battery. At this time, an internal voltage of the Ni-Cd battery continuously supplied with the constant charging current gradually increases to reach a predetermined voltage value. Thus, the controller of the charger is activated to complete the charging of the Ni-Cd battery.

However, when the Ni-Cd battery is left unused for a long period of time, the electromotive force of the Ni-Cd battery is reduced. The Ni-Cd battery whose electromotive force has been reduced in this way has a high electric resistance and needs a high voltage to cause the charging current to flow in the Ni-Cd battery by the constant-current type charger. However, a problem arises in that when the high voltage is continuously supplied to a Ni-Cd battery that has been left for a long period, the Ni-Cd battery generates heat due to its high electric resistance, causing the Ni-Cd battery to deteriorate.

SUMMARY OF THE INVENTION

The present invention was made to solve at least the above problem. It is therefore an object of the present invention to provide a charger capable of recovering a Ni-Cd battery whose electromotive force is reduced because the Ni-Cd battery has been unused for a long period without deteriorating the Ni-Cd battery.

According to one aspect of the present invention, for achieving at least the above object, a charger is provided that is suitable for use in a Ni-Cd (Nickel-Cadmium) battery comprising charging means for causing a charging current to flow in the Ni-Cd battery and increasing an internal voltage of the Ni-Cd battery to a predetermined first voltage to thereby charge the Ni-Cd battery. Discharging means is provided for discharging an electric charge of the Ni-Cd battery charged by the charging means by a predetermined amount or quantity to thereby reduce the first voltage of the Ni-Cd battery to a predetermined second voltage. Controlling means is provided for controlling the Ni-Cd battery so that the Ni-Cd battery is initially and finally charged at least twice and for effecting control for allowing the discharging means to discharge the Ni-Cd battery during a period between the periods in which the Ni-Cd battery is being charged at least twice.

According to this invention, the controlling means allows the charging means to effect a charging process of increasing the internal voltage of the Ni-Cd battery to the predetermined first voltage at least twice. Further, the controlling means causes the Ni-Cd battery to be discharged once during the period between the at least two charging periods. As a result, an internal resistance of the Ni-Cd battery becomes low, and the Ni-Cd battery whose electromotive force has been reduced can be recovered without deterioration.

BRIEF DESCRIPTION OF THE DRAWINGS

Preferred embodiments of the present invention are described in detail with reference to the following figures, wherein.

DETAILED DESCRIPTION OF PREFERRED EMBODIMENT

Figure 1:
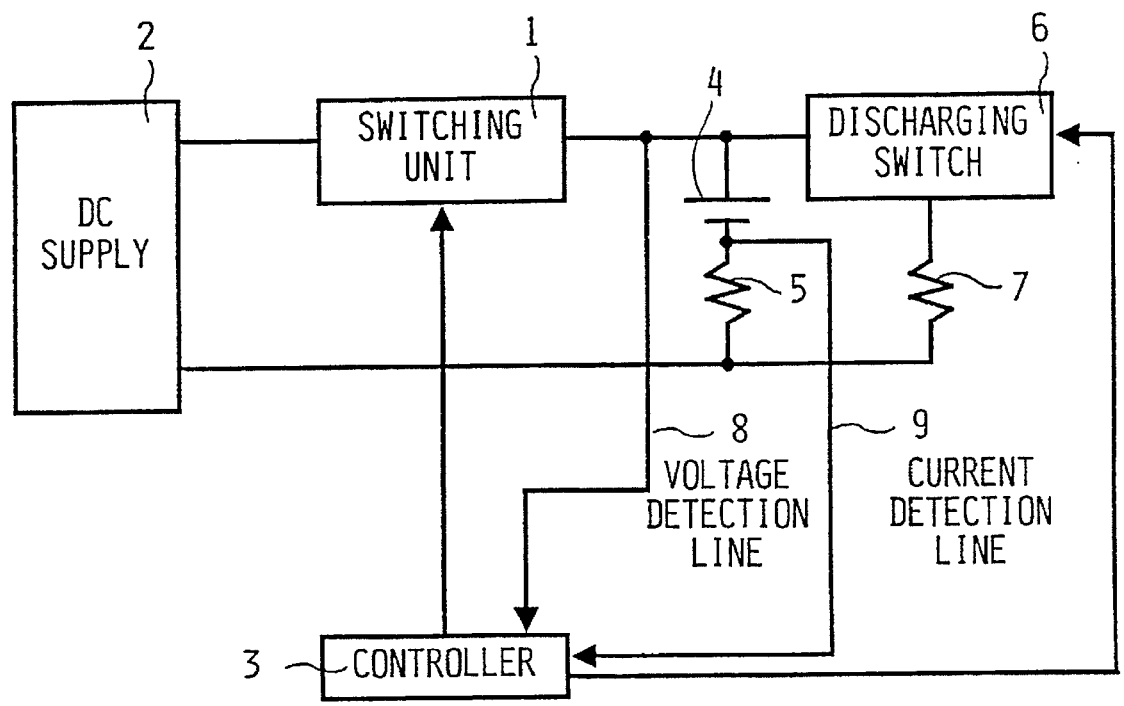
FIG. 1 is a block diagram schematically showing the structure of a charger of the present invention.

Referring to FIG. 1, the structure of a charging device or charger in the present embodiment is schematically described. The charger comprises a switching unit or charging switch 1, a direct current (DC) supply 2, a controller 3, a current detecting resistor 5, a discharging switch 6 and a discharging resistor 7.

The charging switch 1 is electrically connected to the DC supply 2 and the controller 3 and is turned on and off by the controller 3. A Ni-Cd battery 4 is constructed to be connectable to the charging switch 1. When the charging switch 1 is in an "on" state, the DC supply 2 can apply a predetermined voltage $V_0$ to the Ni-Cd battery 4 so that a charging current I flows in the Ni-Cd battery 4. Thus, the Ni-Cd battery 4 is charged by the charging current I. When the charging switch 1 is in an "off" state, the DC supply 2 is electrically disconnected from the Ni-Cd battery 4 so that the predetermined voltage $V_0$ is not applied to the Ni-Cd battery 4, with the result that the Ni-Cd battery 4 is not charged.

The DC supply 2 is electrically connected to the charging switch 1 as described above. Further, the DC supply 2 is electrically connected to the current detecting resistor 5 and the discharging resistor 7. As mentioned above, the DC supply 2 is constructed so that the predetermined voltage $V_0$ can be applied to the Ni-Cd battery 4.

As described above, the controller 3 is electrically connected to the charging switch 1 and further connected to the discharging switch 6. The controller 3 can detect a voltage V applied to the Ni-Cd battery 4 using a voltage detection line 8 electrically connected to the controller 3 between the charging switch 1 and the Ni-Cd battery 4. Further, the controller 3 can detect the current I flowing in the Ni-Cd battery 4 using a current detection line 9 electrically connected to the controller 3 between the Ni-Cd battery 4 and the current detecting resistor 5. The controller 3 has a microcomputer incorporated therein, which comprises a CPU (Central Processing Unit), a ROM (Read Only Memory), a RAM (Random Access Memory), an A/D (Analog/Digital) converter, etc., all of which are not shown in the drawing but are conventional. The controller 3 effects the action of turning each of the charging switch 1 and the discharging switch 6 on and off in accordance with a control program stored in the ROM in advance to thereby enable the Ni-Cd battery 4 to be charged without being deteriorated.

The current detecting resistor 5 is used as a resistor for detecting the current I that flows in the Ni-Cd battery 4 when the Ni-Cd battery 4 is electrically connected to the charger and the charging of the Ni-Cd battery 4 is started.

As described above, the discharging switch 6 is controlled by the controller 3 to be brought into either the on or off state. When the discharging switch 6 is switched on, the electric charge stored in the Ni-Cd battery 4 is discharged through the discharging resistor 7.

Figure 2:
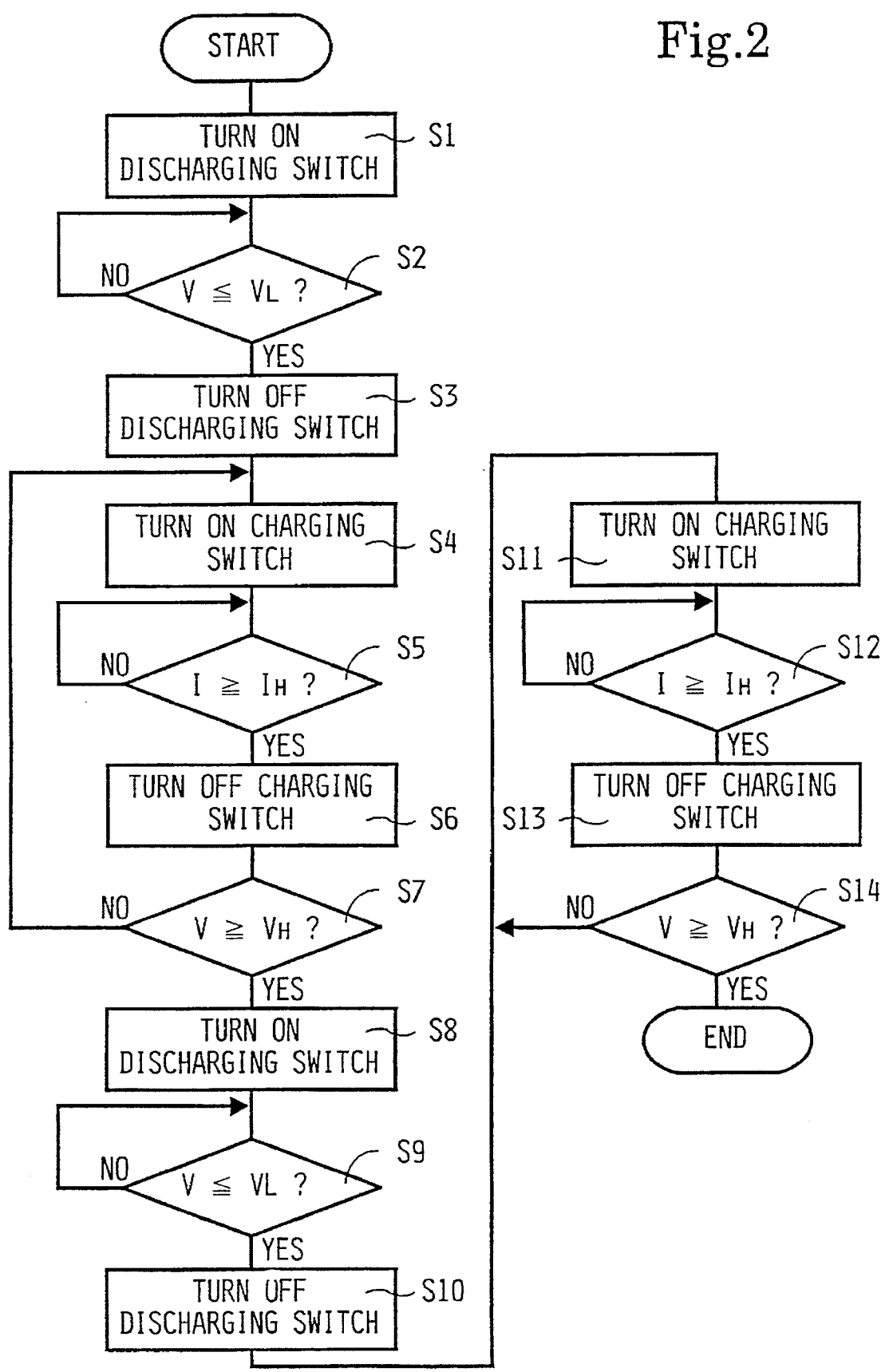
FIG. 2 is a flowchart of the operation of the charger shown in FIG. 1.

A series of charging operations of the charger in the present embodiment is described with reference to FIGS. 1 through 3.

An operator first connects the Ni-Cd battery 4, whose electromotive force has been reduced, to the charger in the present embodiment. In doing so, the controller 3 starts to charge the Ni-Cd battery 4 in accordance with the control program stored in the ROM in advance. At this time, each of the charging switch 1 and the discharging switch 6 is in the off state.

The controller 3 first brings the discharging switch 6 to the on state and allows the discharging resistor 7 to discharge the electric charge of the Ni-Cd battery 4 (Step 1: hereinafter called "S1" and other Steps are abbreviated in the same manner as referred to above). At this time, the controller 3 detects the voltage V of the Ni-Cd battery 4 (S2). If the controller 3 decides that the voltage V of the Ni-Cd battery 4 has not been reduced to a predetermined voltage $V_L$ (i.e., if the answer is negative in S2), then the controller 3 continues to detect the voltage V of the Ni-Cd battery 4. If the controller 3 determines that the voltage V has been reduced to the voltage $V_L$ (i.e., if the answer is affirmative in S2), then the controller 3 switches the discharging switch 6 from the on state to the off state so that the Ni-Cd battery 4 stops discharging (S3). A period from S1 to S3 corresponds to a discharging period D1 shown in FIG. 3. At this time, the current I, which flows in the Ni-Cd battery 4, is brought to a constant current $I_L$.

Next, when the controller 3 switches on the charging switch 1, the DC supply 2 applies the predetermined voltage $V_0$ to the Ni-Cd battery 4 to thereby cause the charging current I to flow in the Ni-Cd battery 4 so that the Ni-Cd battery 4 is charged (S4). At this time, the controller 3 detects the current I flowing in the Ni-Cd battery 4 through the current detecting resistor 5 (S5). If the controller 3 decides that the current I flowing in the Ni-Cd battery 4 has not yet been raised to a predetermined rated capacity, i.e., a predetermined current value $I_H$ (i.e., if the answer is negative in S5), then the controller 3 continues to detect the current I flowing in the Ni-Cd battery 4. If the controller 3 determines that the current I flowing in the Ni-Cd battery 4 has been raised to the predetermined current value $I_L$ (i.e., if the answer is affirmative in S5), then the controller 3 switches off the charging switch 1 to stop the application of the voltage $V_0$ to the Ni-Cd battery 4 (S6). Next, the controller 3 detects the voltage V of the Ni-Cd battery 4 (S7). If the controller 3 determines that the voltage V of the Ni-Cd battery 4 has not been raised to a predetermined voltage $V_H$ (i.e., if the answer is negative in S7), then the controller 3 switches on the charging switch 1 again when the current I flowing in the Ni-Cd battery 4 is brought to 0 and the controller 3 starts to cause the charging current I to flow in the Ni-Cd battery 4 (S4). Thus, the controller 3 repeats the above control from S4. Then, the controller 3 detects the voltage V of the Ni-Cd battery 4 while alternately switching the charging switch 1 on and off. Further, the controller 3 charges the Ni-Cd battery 4 until the voltage V of the Ni-Cd battery 4 is raised up to the predetermined voltage $V_H$. If the controller 3 decides that the voltage V has been raised to the predetermined voltage $V_H$ (i.e., if the answer is affirmative in S7), then the controller 3 brings the discharging switch 6 into the on state so that the electric charge of the Ni-Cd battery 4 is discharged (S8). A repetitive period from S4 to S7 corresponds to a charging period C1 shown in FIG. 3.

Figure 3:
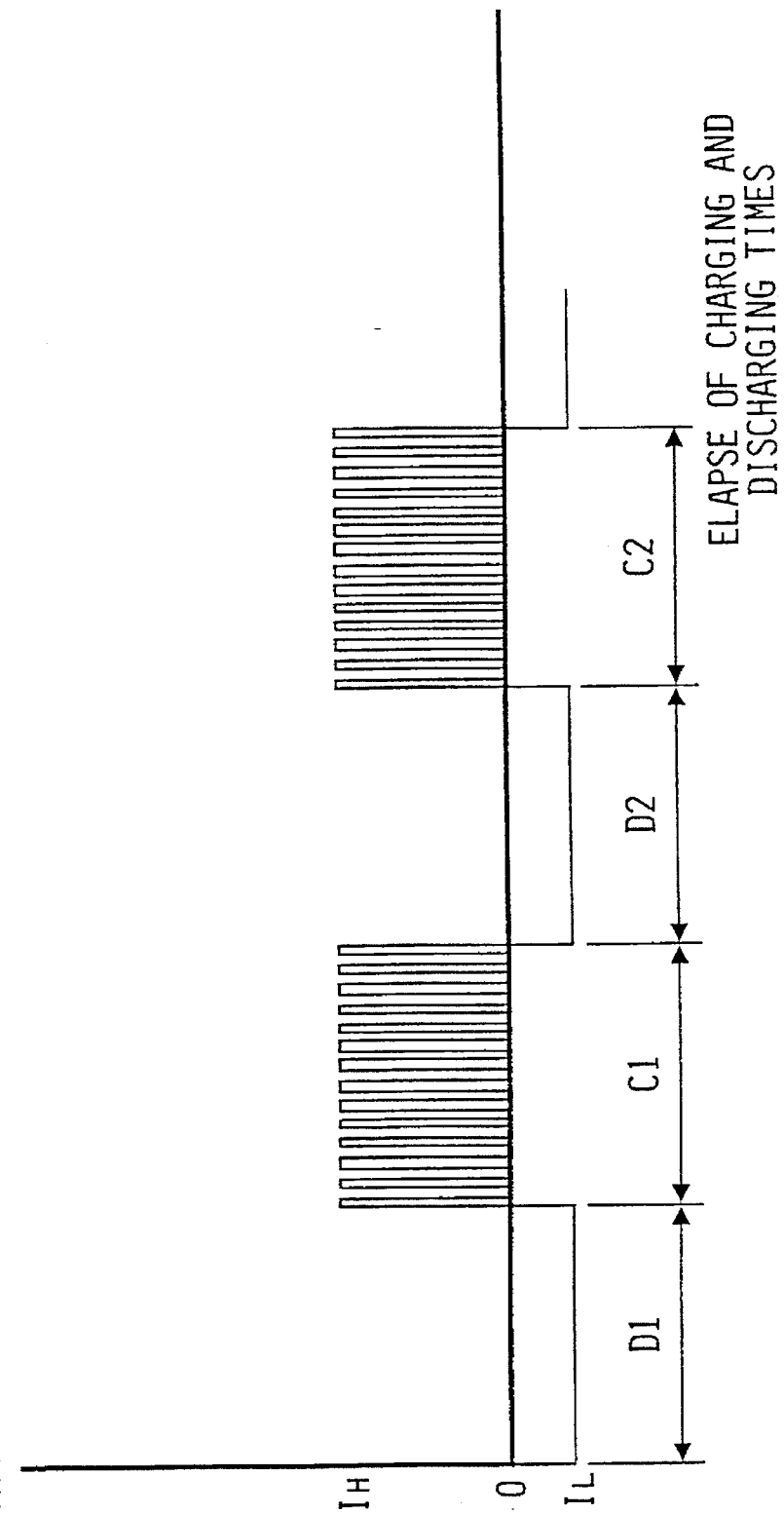
FIG. 3 is a graph of the waveform of a current that flows in a Ni-Cd battery by the charger shown in FIG. 1.

Accordingly, the charging current I having a pulse waveform shown in FIG. 3 flows in the Ni-Cd battery 4 during the charging period C1.

Further, the controller 3 detects the voltage V of the Ni-Cd battery 4 (S9). If the controller 3 decides that the voltage V of the Ni-Cd battery 4 has not been reduced to the predetermined voltage $V_L$ (i.e., if the answer is negative in S9), then the controller 3 continues to detect the voltage V of the Ni-Cd battery 4. If the controller 3 decides that the voltage V has been reduced to the predetermined voltage $V_L$ (i.e., if the answer is affirmative in S9), then the controller 3 turns off the discharging switch 6 so that the Ni-Cd battery 4 stops discharging (S10). A period from S8 to S10 corresponds to a discharging period D2 shown in FIG. 3. At this time, the current I flowing in the Ni-Cd battery 4 is brought to the constant current $I_L$.

Next, when the controller 3 switches on the charging switch 1 again, the DC supply 2 applies the predetermined voltage $V_0$ to the Ni-Cd battery 4 to thereby allow the charging current I to flow in the Ni-Cd battery 4 so that the Ni-Cd battery 4 is charged (S11). At this time, the controller 3 detects the current I flowing in the Ni-Cd battery 4 through the current detecting resistor 5 (S12). If the controller 3 decides that the current I flowing in the Ni-Cd battery 4 has not yet been raised to the predetermined current value $I_H$ (i.e., if the answer is negative in S12), then the controller 3 continues to detect the current I flowing in the Ni-Cd battery 4. If the controller 3 determines that the current I flowing in the Ni-Cd battery 4 has been raised to the predetermined current value $I_H$ (i.e., if the answer is affirmative in S12), then the controller 3 switches off the charging switch 1 to stop the application of the voltage $V_0$ to the Ni-Cd battery 4 (S13). Further, the controller 3 detects the voltage V of the Ni-Cd battery 4 (S14). If the controller 3 determines that the voltage V of the Ni-Cd battery 4 has not been raised to the predetermined voltage $V_H$ (i.e., if the answer is negative in S14), then the controller 3 repeats the above control from S4. Then, the controller 3 detects the voltage V of the Ni-Cd battery 4 while repeating the action of turning the charging switch 1 on and off. Further, the controller 3 charges the Ni-Cd battery 4 until the voltage V is raised up to the predetermined voltage $V_H$. If the controller 3 decides that the voltage V has been raised to the predetermined voltage $V_H$ (i.e., if the answer is affirmative in S14), then the controller 3 stops the Ni-Cd battery 4 from being charged. A repetitive period from S11 to S14 corresponds to a charging period C2 shown in FIG. 3. Accordingly, the charging current I having a pulse waveform shown in FIG. 3 flows in the Ni-Cd battery 4 during the charging period C2. When the process in S14 is completed, the control program used for the charging of the Ni-Cd battery 4, which has been stored in the ROM, is finished and the charging of the Ni-Cd battery 4 is completed.

Thus, according to the charger of the present embodiment, the charging current I, which flows in the Ni-Cd battery 4, is not excessively increased beyond the predetermined rated capacity of the Ni-Cd battery 4, i.e., the predetermined current value $I_H$. Therefore, the Ni-Cd battery 4 is not deteriorated due to the heat generated.

Since the voltage $V_0$ of the DC supply 2 is set to a voltage value which can provide a sufficient charging current I even if the electromotive force of the Ni-Cd battery 4 is reduced and its electric resistance is high, the capacity of the Ni-Cd battery 4 can be recovered.

Further, since the charging (C1) is first executed between the discharging periods D1 and D2 prior to the charging period C2 in the present embodiment, the internal electric resistance of the Ni-Cd battery 4 at the charging period C2 is lower than that of the Ni-Cd battery 4 at the charging period C1. Accordingly, the Ni-Cd battery 4 is more uniformly charged during the charging period C2. As a result, the electromotive force of the Ni-Cd battery 4 is recovered.

As is apparent from the above detailed description, the charger of the present invention has a controlling means for cutting off the flow of the charging current when the charging current reaches the rated capacity of the Ni-Cd battery and for subsequently effecting a repetitive control of both the charging of the Ni-Cd battery and the cutting off of the charging current. Further, since the Ni-Cd battery is charged using the current in which the rated current value of the Ni-Cd battery to be charged and the current value 0 are alternately repeated, the Ni-Cd battery whose electromotive force has been reduced and whose internal electric resistance has increased, can be charged without continuously generating heat. Besides, the capacity of the Ni-Cd battery whose electromotive force has been reduced can be recovered without any deterioration in the Ni-Cd battery.

Incidentally, the present invention is not necessarily limited by the embodiment described in detail above. It will be apparent to those skilled in the art that many changes and modifications can be made without departing from the spirit or scope of the invention as set forth herein.

In the charger according to the present embodiment, the charging and discharging of the Ni-Cd battery 4 are respectively executed twice. However, the charger may be controlled in such a manner that the charging and discharging thereof are respectively carried out three times or more.

Further, the charger according to the present embodiment starts charging from or during the discharging period D1 but may start charging from or during the charging period C1 where the Ni-Cd battery 4 has been sufficiently discharged in advance.

What is claimed is:

1. A charger for use with a Ni-Cd (Nickel-Cadmium) battery, comprising:

charging means for causing a charging current to flow in the Ni-Cd battery and for increasing an internal voltage of the Ni-Cd battery to a predetermined first voltage to thereby charge the Ni-Cd battery;

discharging means for discharging an electric charge from the Ni-Cd battery charged by said charging means by a predetermined voltage quantity to thereby reduce the first voltage of the Ni-Cd battery to a predetermined second voltage;

controlling means coupled to said charging means and said discharging means for controlling the charging means to charge the Ni-Cd battery for at least initial and final charging periods and for controlling said discharging means to effect discharging during a period between a the initial and final charging periods;

voltage detecting means coupled to said controlling means for detecting the internal voltage of the Ni-Cd battery; and current detecting means coupled to said controlling means for detecting the charging current flowing in the Ni-Cd battery, wherein said controlling means controls said charging means to stop charging the Ni-Cd battery when the charging current detected by said current detecting means reaches a predetermined current value.

2. The charger as claimed in claim 1, wherein said controlling means controls said charging means to resume charging the Ni-Cd battery when the internal voltage detected by said voltage detecting means is less than the first voltage.

3. The charger as claimed in claim 2, wherein said controlling means controls said discharging means to start discharging the Ni-Cd battery when the internal voltage detected by said voltage detecting means reaches the first voltage during the initial charging period.

4. The charger as claimed in claim 2, wherein said controlling means controls said charging means to complete charging of the Ni-Cd battery when the internal voltage detected by said voltage detecting means reaches the first voltage during the final charging period.

5. The charger as claimed in claim 1, wherein said controlling means controls said charging means to charge the Ni-Cd battery for at least one intermediate charging period and controls said discharging means to discharge the Ni-Cd battery between each charging period.

6. The charger as claimed in claim 5, wherein said controlling means controls said discharging means to start discharging the Ni-Cd battery when the internal voltage detected by said voltage detecting means reaches the first voltage during the initial and intermediate charging periods.

7. The charger as claimed in claim 5, wherein said controlling means controls said charging means to complete charging of the Ni-Cd battery when the internal voltage detected by said voltage detecting means reaches the first voltage during the final charging period.

8. A charging device for charging a battery, comprising:

a DC supply that supplies a direct current;

a charging switch electrically connected to the DC supply and electrically connectable to a battery;

a controller electrically connected to the charging switch to control the charging switch to selectively electrically connect the DC supply to the battery;

a discharging assembly electrically connected to the controller and electrically connectable to the battery, wherein the discharging assembly is controlled by the controller for selective electrical connection with the battery to effect discharge of the battery;

a voltage detection device electrically connected to the controller between the charging switch and the battery that detects voltage applied to the battery; and a current detection assembly electrically connected to the controller and connectable to the battery that detects current in the battery, wherein the controller controls the charging switch to stop charging the battery when the charging current detected by the current detection assembly reaches a predetermined current value, and wherein the controller controls the charging switch to consecutively charge the battery for a first period of time, discharge the battery for a second period of time and charge the battery for a third period of time, the periods of time being based on the detected voltage and the detected current.

9. The charging device of claim 8 wherein the current detection assembly comprises a current detecting resistor electrically connected between the DC supply and the battery and a current detection line electrically connected to the controller between the current detecting resistor and the battery.

10. The charging device of claim 8 wherein the discharging assembly comprises a discharge switch connected to the controller and a discharging resistor connected to the discharging switch.

11. The charging device of claim 8 in combination with a Ni-Cd (Nickel-Cadmium) battery.

12. A method of charging a battery, comprising the steps of:

initially charging the battery by causing a charging current to flow in the battery to raise an internal voltage of the battery to predetermined first voltage and detecting a charging current flowing into the battery and stopping the charging of the battery when the detected charging current reaches a predetermined current value;

discharging an electric charge of the battery charged to the predetermined first voltage by a predetermined voltage quantity to reduce the first voltage of the battery to a predetermined second voltage; and finally charging the battery by causing a charging current to flow in the discharged battery to again increase the internal voltage of the battery to the first voltage.

13. The method as claimed in claim 12, wherein the step of initially charging includes detecting an internal voltage of the battery and resuming charging of the battery when the detected internal voltage is less than the first voltage.

14. The method as claimed in claim 12, wherein the step of initially charging includes detecting an internal voltage of the battery and completing charging of the battery when the detected internal voltage reaches the first voltage.

15. The method as claimed in claim 12, further including the following steps prior to the step of finally charging the battery:

intermediately charging the battery by causing a charging current to flow in the battery to increase an internal voltage of the battery to the predetermined first voltage; and intermediately discharging the battery by discharging an electric charge of the intermediately charged battery by a predetermined voltage quantity to reduce the first voltage of the battery to the predetermined second voltage.

16. The method as claimed in claim 15, further comprising executing a series of the intermediate charging and discharging steps.

17. The method as claimed in claim 12, wherein prior to the step of initially charging the battery, the method further comprises an initial discharging step for discharging an initial electric charge of the battery by a predetermined quantity to reduce the voltage of the battery to the predetermined second voltage.

18. The method as claimed in claim 12 further comprising the step of coupling a charger to a Ni-Cd (Nickel-Cadmium) battery to execute the charging and discharging steps.

19. A charger for use with a Ni-Cd (Nickel-Cadmium) battery, comprising:

charging means for causing a charging current to flow in the Ni-Cd battery and for increasing an internal voltage of the Ni-Cd battery to a predetermined first voltage to thereby charge the Ni-Cd battery;

discharging means for discharging an electric charge from the Ni-Cd battery charged by said charging means by a predetermined voltage quantity to thereby reduce the first voltage of the Ni-Cd battery to a predetermined second voltage;

controlling means coupled to said charging means and said discharging means for controlling the charging means to charge the Ni-Cd battery for at least initial and final charging periods and for controlling said discharging means to effect discharging during a period between the initial and final charging periods;

voltage detecting means coupled to said controlling means for detecting the internal voltage of the Ni-Cd battery; and current detecting means coupled to said controlling means for detecting the charging current flowing in the Ni-Cd battery;

wherein said controlling means controls said charging means to stop charging the Ni-Cd battery when the charging current detected by said current detecting means reaches a predetermined current value.

20. The charger as claimed in claim 19, wherein said controlling means controls said charging means to resume charging the Ni-Cd battery when the internal voltage detected by said voltage detecting means is less than the first voltage.

21. The charger as claimed in claim 20, wherein said controlling means controls said discharging means to start discharging the Ni-Cd battery when the internal voltage detected by said voltage detecting means reaches the first voltage during the initial charging period.

22. The charger as claimed in claim 20, wherein said controlling means controls said charging means to complete charging of the Ni-Cd battery when the internal voltage detected by said voltage detecting means reaches the first voltage during the final charging period.

* * * * *